United States Patent
Lee et al.

(10) Patent No.: US 11,376,909 B2
(45) Date of Patent: Jul. 5, 2022

(54) SUSPENSION JOINING STRUCTURE

(71) Applicants: Hyundai Motor Company, Seoul (KR); Kia Motors Corporation, Seoul (KR)

(72) Inventors: Jae Won Lee, Bucheon-si (KR); Jae Young Kim, Ulsan (KR); Gab Bae Jeon, Hwaseong-si (KR); Ha Kyung Moon, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/089,587

(22) Filed: Nov. 4, 2020

(65) Prior Publication Data

US 2021/0394572 A1 Dec. 23, 2021

(30) Foreign Application Priority Data

Jun. 22, 2020 (KR) .................. 10-2020-0075428

(51) Int. Cl.
*B60G 3/06* (2006.01)
*B62D 7/18* (2006.01)
*B60G 7/00* (2006.01)

(52) U.S. Cl.
CPC .............. *B60G 3/06* (2013.01); *B60G 7/001* (2013.01); *B60G 7/005* (2013.01); *B62D 7/18* (2013.01); *B60G 2200/142* (2013.01); *B60G 2204/148* (2013.01); *B60G 2206/124* (2013.01)

(58) Field of Classification Search
CPC .......... B60G 3/06; B60G 7/001; B60G 7/005; B60G 2206/124; B60G 2200/142; B60G 2204/148; B62D 7/18
See application file for complete search history.

(56) References Cited

U.S. PATENT DOCUMENTS

| | | | |
|---|---|---|---|
| 5,192,100 A | 3/1993 | Rumpel et al. | |
| 5,938,219 A * | 8/1999 | Hayami | B60G 3/20 280/124.135 |
| 8,152,185 B2 | 4/2012 | Siebebeick | |
| 8,205,900 B1 * | 6/2012 | Moravy | B60G 3/265 280/124.138 |
| 2003/0234504 A1 | 12/2003 | Frantzen | |
| 2006/0290088 A1 * | 12/2006 | Luttinen | B60G 3/06 280/93.51 |

(Continued)

FOREIGN PATENT DOCUMENTS

KR 10-2007-0103191 A 10/2007
WO WO 2005/023569 A 3/2005

*Primary Examiner* — Darlene P Condra
(74) *Attorney, Agent, or Firm* — Morgan, Lewis & Bockius LLP (57) ABSTRACT

A suspension joining structure may include a lower arm which has one end portion fastened to a vehicle body, an assist knuckle on which a strut portion is located, a fastening unit which is configured so that a second end portion of the lower arm and a lower end portion of the assist knuckle are fastened, a revoknuckle which is pivotally fastened to the assist knuckle to be rotated independently of the assist knuckle to perform the steering of a wheel, and a steering input portion fastened to the revoknuckle and configured to apply a steering force to the revoknuckle upon the steering of the wheel.

7 Claims, 6 Drawing Sheets

(56) References Cited

U.S. PATENT DOCUMENTS

| | | | | |
|---|---|---|---|---|
| 2007/0187917 | A1* | 8/2007 | Hasegawa | B62D 7/06 |
| | | | | 280/93.51 |
| 2008/0303234 | A1* | 12/2008 | Mc Cann | B62D 7/18 |
| | | | | 280/93.511 |
| 2009/0261550 | A1* | 10/2009 | Siebeneick | B60G 7/008 |
| | | | | 280/93.512 |
| 2013/0008736 | A1* | 1/2013 | Kuwabara | B60G 7/008 |
| | | | | 180/291 |
| 2019/0135067 | A1* | 5/2019 | Hintzen | F16F 9/3221 |
| 2019/0351937 | A1* | 11/2019 | Sohal | B62D 3/12 |
| 2020/0189341 | A1* | 6/2020 | Shin | B60G 99/002 |

* cited by examiner

ROTATIONAL
MOTION

FIG. 3B

WHEEL CENTER,
ABSORPTION OF FRONT-REAR BEHAVIOR
(BASED ON VEHICLE)

FIG. 3C

WHEEL CENTER,
ABSORPTION OF LEFT-RIGHT BEHAVIOR
(BASED ON VEHICLE)

SUSPENSION JOINING STRUCTURE

CROSS-REFERENCE TO RELATED APPLICATION

The present application claims priority to Korean Patent Application No. 10-2020-0075428 filed on Jun. 22, 2020, the entire contents of which is incorporated herein for all purposes by this reference.

BACKGROUND OF THE INVENTION

Field of the Invention

The present invention relates to a suspension joining structure, and to a suspension joining structure which may provide a joining structure of a knuckle and a lower arm of a McPherson type suspension to perform a steering input of a wheel through independent rotation of a revoknuckle.

Description of Related Art

A suspension for cushioning vibrations generated between wheels and the road surface is provided at a portion where the wheels are provided in the vehicle.

Various types of suspension have been provided, and a suspension suitable for each vehicle model is selected and applied.

Figure 1:
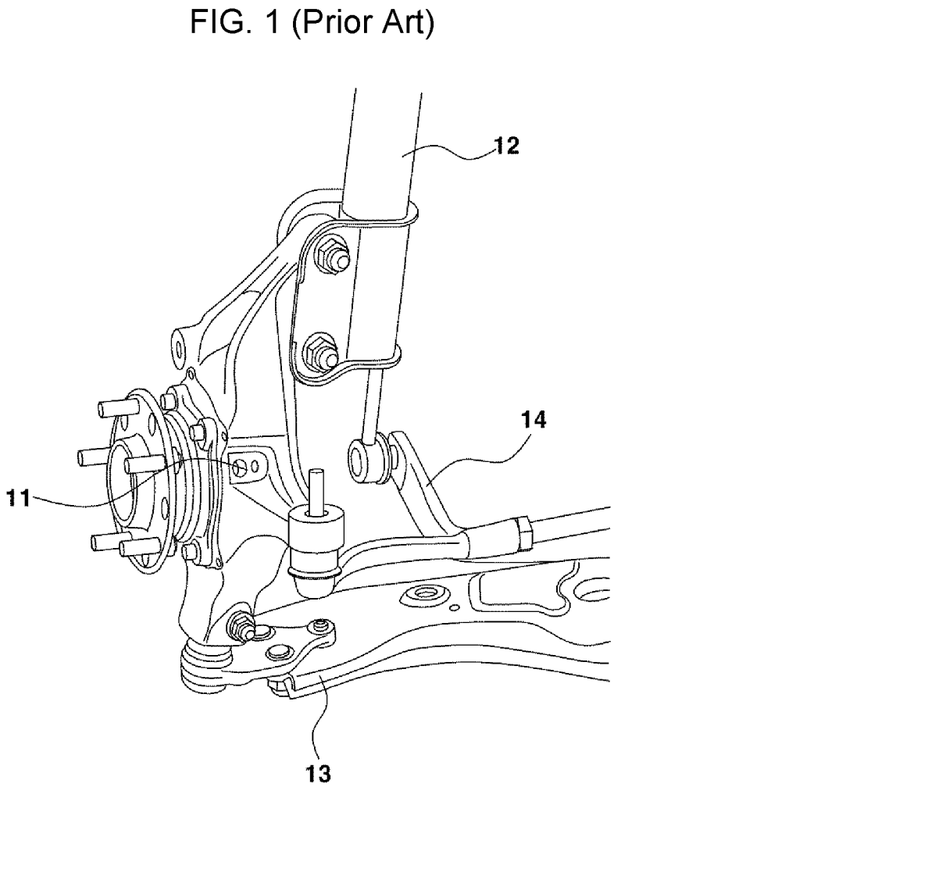
FIG. 1 is a diagram illustrating a joining relationship of a revoknuckle, as the related art.

As an example, there is a McPherson suspension illustrated in FIG. 1.

The McPherson suspension includes a revoknuckle, a shock absorber 12 which is provided on the upper portion of the revoknuckle to absorb vibration, a lower arm 13 which is connected to the lower portion of the revoknuckle 11, and a stabilizer 14 which is connected to the lower portion of the revoknuckle 11 or the lower portion or the shock absorber 12.

The revoknuckle 11 includes a wheel mount portion in which a wheel (W) is provided at the center portion thereof, a shock absorber connection portion which is connected to the shock absorber 12 at the upper portion of the revoknuckle, and a lower arm connection portion which is connected to the lower arm 12 at the lower portion of the revoknuckle 11.

However, the aforementioned structure has a structural limitation in that a steering force may be applied to the wheel only when the revoknuckle is rotated with an assist knuckle, if an operating force is applied to the revoknuckle upon the steering of the wheel.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an assist knuckle which is fastened to a lower arm, and to provide a revoknuckle which is located on the center axis of the assist knuckle to perform an independent rotation.

Furthermore, various aspects of the present invention are directed to providing a technology for limiting the rotation of the assist knuckle when the revoknuckle is rotated through a fastening unit located between the lower arm and the assist knuckle.

The objects of the present invention are not limited to the objects mentioned above, and other objects of the present invention that are not mentioned may be understood by the following description, and may be more clearly understood by examples of the present invention. Furthermore, the objects of the present invention may be realized by the claims and combinations thereof.

A suspension joining structure for achieving the objects of the present invention includes the following configuration.

Various exemplary embodiments of the present invention includes a suspension joining structure including: a lower arm which has a first end portion configured to be fastened to a vehicle body; an assist knuckle on which a strut portion is mounted; a fastening unit, wherein a second end portion of the lower arm and a lower end portion of the assist knuckle are fastened by the fastening unit; a revoknuckle which is pivotally fastened to the assist knuckle to be rotated independently of the assist knuckle to perform a steering of a wheel; and a steering input portion fastened to the revoknuckle and configured to apply a steering force to the revoknuckle upon the steering of the wheel.

Furthermore, the exemplary embodiment of the present invention includes the suspension joining structure in which the steering input portion includes a tie rod which is pivotally fastened to one end portion of the revoknuckle and to which a rotational force is applied to the revoknuckle by the steering actuator in a response to a steering input.

Furthermore, the exemplary embodiment of the present invention includes the suspension joining structure in which the steering input portion includes a steering actuator which is fastened directly to the revoknuckle to apply a rotational force to the revoknuckle.

Furthermore, the exemplary embodiment of the present invention includes the suspension joining structure in which the steering actuator is fixed to one end portion of the revoknuckle fastened to an end portion of the assist knuckle in which is offset from an axis of the strut portion and configured so that the rotational force is applied to the revoknuckle by the steering actuator in a response to a steering input.

Furthermore, the exemplary embodiment of the present invention includes the suspension joining structure in which the fastening unit is composed as a universal joint.

Furthermore, the exemplary embodiment of the present invention includes the suspension joining structure including: an upper end hole which is located at an upper end portion of the assist knuckle and into which an upper end protrusion of the revoknuckle is pivotally coupled; and a lower end hole which is located at the lower end portion of the assist knuckle and into which a lower end protrusion of the revoknuckle is pivotally coupled, in which the revoknuckle is configured to be rotated with respect to the upper end hole and the lower end hole.

Furthermore, the exemplary embodiment of the present invention includes the suspension joining structure in which the fastening unit may further include a yoke which is located on and fixed to the second end portion of the lower arm; a ball stud which is fastened to the lower end portion of the assist knuckle; and a cross shaft portion which pivotally couples the yoke and the ball stud, wherein the yoke and the ball stud have rotation axes different from each other.

The present invention may obtain the following effects by the aforementioned exemplary embodiments and the configuration, combination, and use relationship to be described below.

Various aspects of the present invention provide the revoknuckle rotated independently of the assist knuckle, providing the high degree of freedom of the suspension.

Furthermore, various aspects of the present invention provide the fastening unit which joins the lower arm and the assist knuckle so that the revoknuckle rotates independently, providing the structural simplification.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in more detail with reference to the accompanying drawings. The exemplary embodiments of the present invention may be modified in various forms, and the scope of the present invention may not be interpreted as being limited to the following exemplary embodiments. The exemplary embodiment of the present invention is provided to more fully describe the present invention to those skilled in the art.

Furthermore, terms such as ". . . knuckle", ". . . unit", and ". . . part" described in the specification mean a unit which processes at least one function or operation, which may be implemented in hardware or a combination of hardware.

Hereinafter, various exemplary embodiments will be described in detail with reference to the accompanying drawings, and in describing with reference to the accompanying drawings, the same or corresponding components will be denoted by the same reference numbers, and description overlapping with the same will be omitted.

The present invention relates to a suspension joining structure in which a revoknuckle 100 is located inside an assist knuckle 200 and configured to be rotatable independently of the assist knuckle 200.

Figure 2:
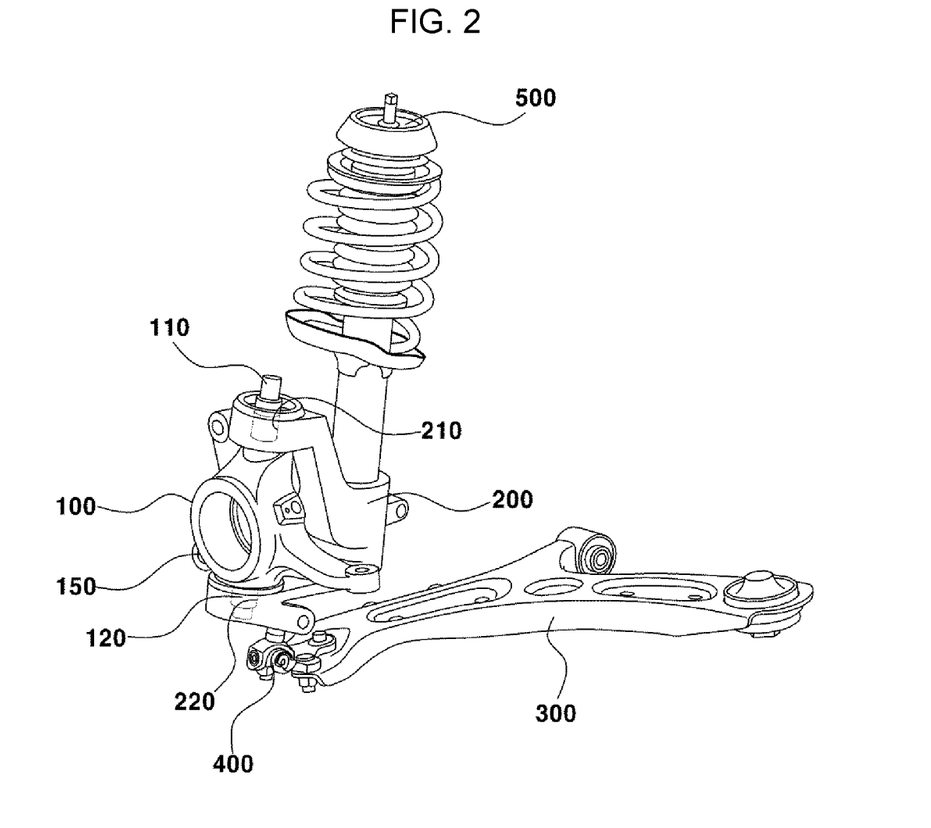
FIG. 2 is a perspective diagram illustrating a suspension joining structure, as various exemplary embodiments of the present invention.
Figure 3A:
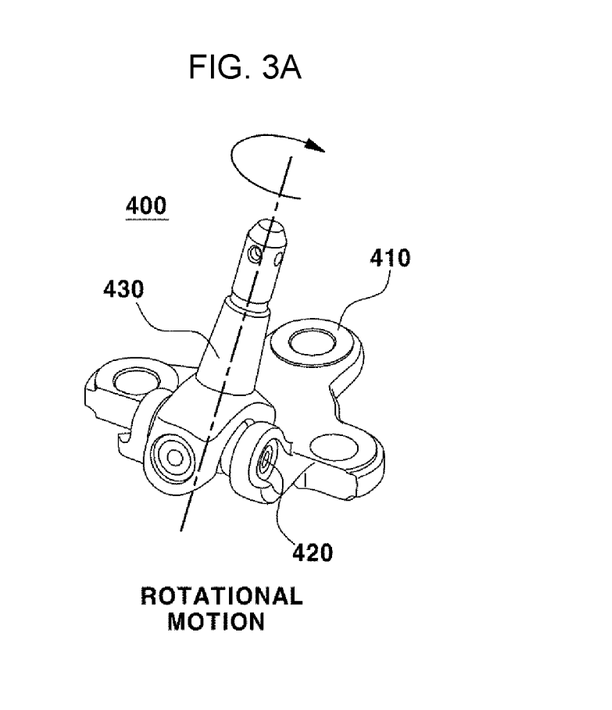
FIG. 3A, FIG. 3B and FIG. 3C are diagrams illustrating a motion of the degree of freedom of a fastening unit of the suspension joining structure, as the exemplary embodiment of the present invention.
Figure 3B:
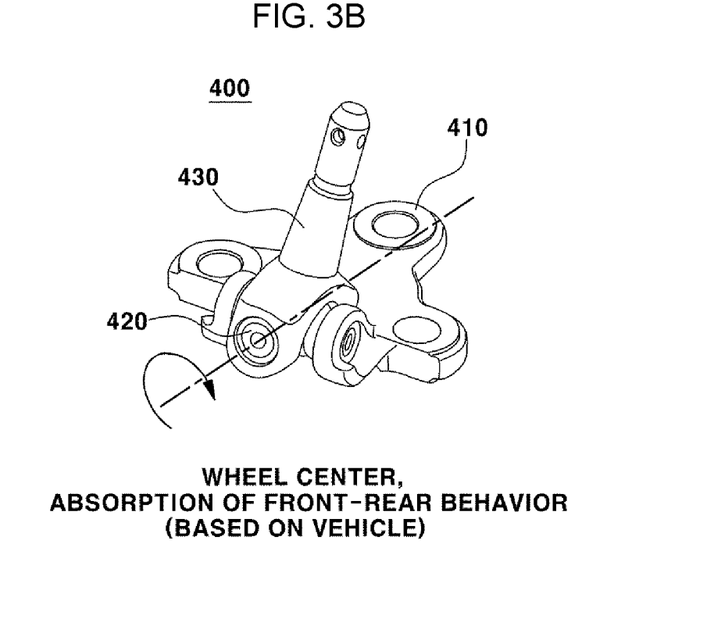
Figure 3C:
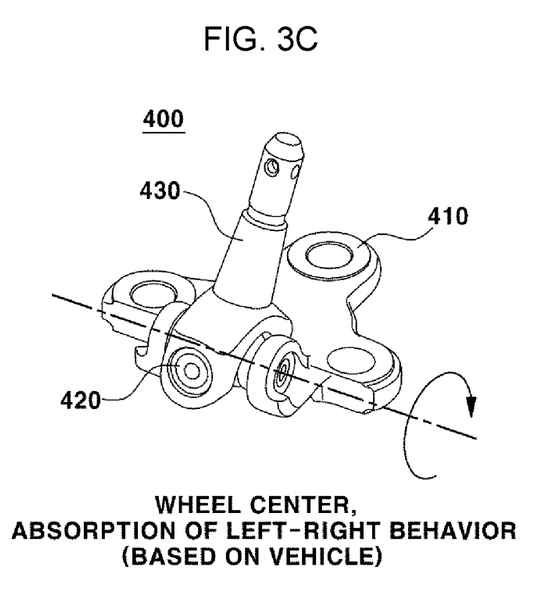
Figure 4:
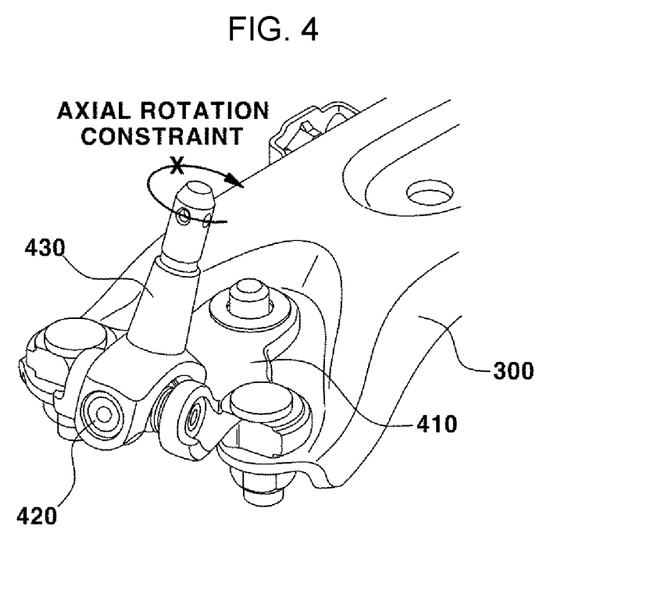
FIG. 4 is an enlarged diagram illustrating the fastening unit of the suspension joining structure, as the exemplary embodiment of the present invention.

FIG. 2 is a perspective diagram illustrating a suspension joining structure, as various exemplary embodiments of the present invention.

The suspension joining structure includes a lower arm 300 which is fastened to a vehicle body or a frame and located in a width direction of a vehicle, and an assist knuckle 200 which is located at one end portion of the lower arm 300 and configured to be located at the upper end portion of a strut portion 500. The strut portion 500 located at the upper end portion of the assist knuckle 200 is used as a concept including a shock absorber.

The present suspension joining structure includes the revoknuckle 100 which is located in a recessed space of the assist knuckle 200, has the end portions each fastened to both extending insides of the assist knuckle 200, and one surface of the revoknuckle 100 includes a wheel mount portion 150 to which a wheel is mounted.

In various exemplary embodiments of the present invention, the revoknuckle 100 includes an upper end protrusion and a lower end protrusion to be fastened between an upper end hole 210 and a lower end hole 220 of the assist knuckle 200. The revoknuckle 100 is rotated by use of the upper end protrusion and the lower end protrusion as the center axis, and configured to have the same rotation axis as the center axis connecting the upper end hole 210 and the lower end hole 220 of the assist knuckle 200.

Moreover, the suspension joining structure includes a steering input portion fastened to the revoknuckle 100 so that a steering force is applied in a response to the user's steering input. In the exemplary embodiment of the present invention, the steering input portion may be composed as a tie rod 610 which applies a mechanical steering force, or composed as a steering actuator 620 which is fastened to an upper end protrusion 110 to generate the steering force by an electronic signal.

If the tie rod 610 is located as the steering input portion, the present invention includes a connection portion 130 which fastens the revoknuckle 100 to the tie rod 610, and the revoknuckle 100 is configured to be rotated with respect to the center axis of the assist knuckle 200 in a response to the movement in the width direction of the tie rod 610. The side of the revoknuckle 100 fastened to the tie rod 610 includes an extension 140 which protrudes outwardly from the assist knuckle 200, and the connection portion 130 fastened to the tie rod 610 may be configured to be located on the extension 140.

As another exemplary embodiment of the present invention, if the steering input portion is composed as the steering actuator 620, the upper end protrusion 110 of the revoknuckle 100 and the steering actuator 620 are fixed, and the steering actuator 620 may be configured to rotate the revoknuckle 100 in a response to the user's steering input.

One end portion of the lower arm and the lower end portion of the assist knuckle 200 are configured to be joined through a fastening unit 400, and the fastening unit 400 is configured to prevent from being rotated around the center axis of the assist knuckle 200 in the height direction and to absorb the front and rear behavior and the left and right behavior applied from the wheel. Accordingly, the revoknuckle 100 may be rotated and moved inside the assist knuckle 200 independently of the assist knuckle 200, and the assist knuckle 200 may maintain the state of being fixed to the lower arm 300 and the strut portion 500.

The fastening unit 400 is composed as a universal joint to limit the rotational force of the assist knuckle 200 and configured to absorb vibrations in the front and rear direction and the width direction of the vehicle applied from the wheel.

The fastening unit 400 is configured at a location adjacent to the lower end hole 220 of the assist knuckle 200 into which the lower end protrusion 120 of the revoknuckle 100 is inserted. The exemplary embodiment of the present invention is configured to further include a pinch bolt or a lock nut which integrally fixes the assist knuckle 200 and a ball stud 430 by inserting the ball stud 430 of the fastening unit 400 into the assist knuckle 200.

FIGS. 3A to 3C and FIG. 4 illustrate the fastening unit 400 which is fastened to the lower arm 300, and illustrate the motion of degree of freedom corresponding to the three-directional motions.

The fastening unit 400 includes a yoke 410 which is located at and mounted to one end portion of the lower arm 300, and a ball stud 430 fastened to the assist knuckle 200 and includes a cross shaft portion 420 which is configured so that the yoke 410 and the ball stud 430 are fastened to the center axes different from each other. The ball stud 430 is configured to be fixed to the assist knuckle 200 through the pinch bolt or the lock nut. Accordingly, the assist knuckle 200 is configured to be fixed to the ball stud 430 located at the lower end portion thereof and the strut portion 500 located at the upper end portion thereof.

If the behavior in the front and rear direction applied from the wheel occurs, it is configured so that the shock is absorbed through the rotation between the components which are connected to respect to the center axis of the cross shaft portion 420 fastened to the ball stud 430, and if the left and right behavior applied from the wheel occurs, it is configured so that the shock is absorbed through the rotation between the components which are connected to respect to the center axis of the cross shaft portion 420 fastened to the lower arm 300.

If the front and rear behavior of the wheel occurs, the ball stud 430 is configured to be rotatable with respect to the center axis of the cross shaft portion 420 formed along the width direction of the vehicle, and thus configured so that the behavior of the wheel is absorbed. Furthermore, if the behavior in the width direction of the wheel occurs, the ball stud 430 is configured to be rotatable in the width direction of the vehicle with respect to the center axis of the cross shaft portion 420 formed in the longitudinal direction of the vehicle and thus configured so that the behavior may be absorbed.

In brief, the fastening unit 400 has two rotation axes with respect to the cross shaft portion 420, and is configured to absorb the front and rear behavior and the left and right behavior applied from the wheel by respective different rotation axes.

However, the assist knuckle 200 fastened to the ball stud 430 is configured to maintain the fixed state, and the degree of freedom of the rotation of the assist knuckle 200 may maintain the fixed state by use of the ball stud 430 as the center axis.

Figure 5:
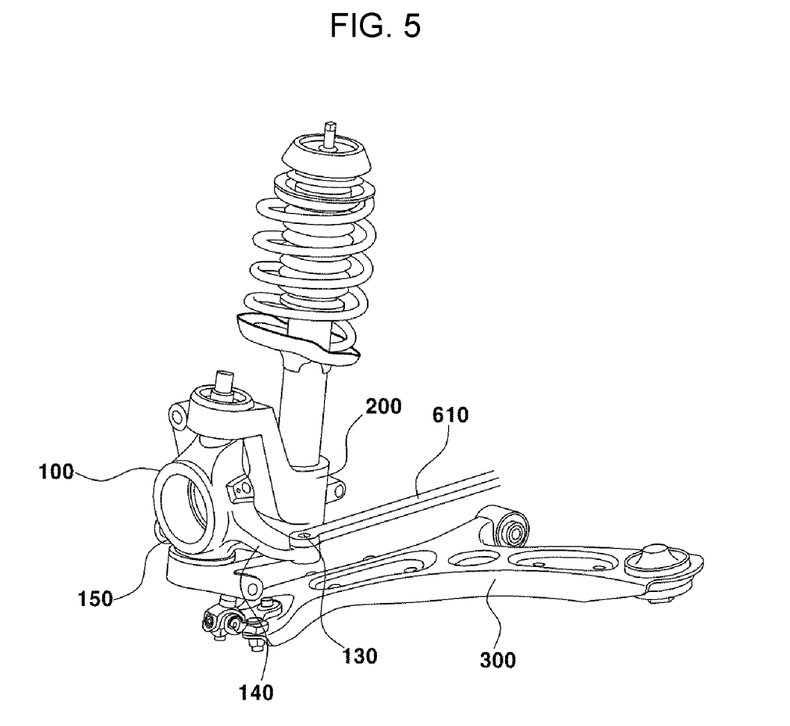
FIG. 5 is a perspective diagram illustrating the suspension joining structure including a tie rod, as the exemplary embodiment of the present invention.

FIG. 5 illustrates the suspension fastening structure including the revoknuckle 100 to which the tie rod 610 is fastened as the steering input portion.

The revoknuckle 100 is configured so that the upper end protrusion 110 is located in the upper end hole 210 of the assist knuckle 200, and the lower end protrusion 120 is located in the lower end hole 220 of the assist knuckle 200, and includes the extension 140 which protrudes to the side surface thereof and the tie rod 610 is fastened to the connection portion 130 located on the extension 140. Accordingly, as the tie rod 610 moves in the width direction of the vehicle, the revoknuckle 100 is configured to be rotated by use of the upper end hole 210 and the lower end hole 220 of the assist knuckle 200 as the center axis.

Figure 6:
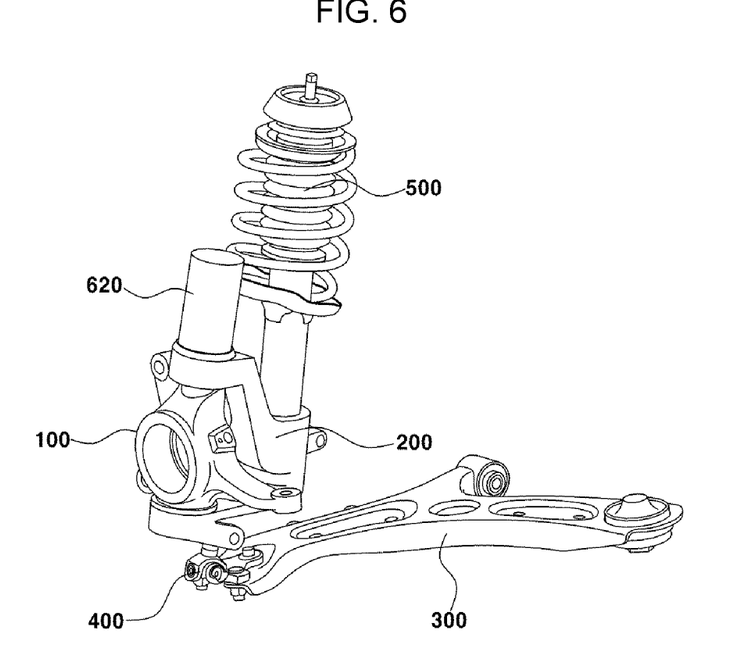
FIG. 6 is a perspective diagram illustrating the suspension joining structure including a steering actuator, as the exemplary embodiment of the present invention.

FIG. 6 illustrates a configuration of the steering actuator 620 which is fastened to the upper end protrusion 110 of the revoknuckle 100 as the steering input portion.

The steering actuator 620 is configured to be integrally connected to the upper end protrusion 110 of the revoknuckle 100, and configured to transfer the rotational force of the steering actuator 620 directly to the revoknuckle 100. The rotational force controls the steering actuator 620 through a control portion which receives a handle steering input of the user, and is configured so that the steering angle of the wheel is applied by the rotation of the revoknuckle 100.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A suspension joining structure comprising:
a lower arm which has a first end portion configured to be fastened to a vehicle body;
an assist knuckle on which a strut portion is mounted;
a fastening unit, wherein a second end portion of the lower arm and a lower end portion of the assist knuckle are fastened by the fastening unit;
a revoknuckle which is pivotally fastened to the assist knuckle to be rotated independently of the assist knuckle to perform a steering of a wheel; and
a steering input portion fastened to the revoknuckle and configured to apply a steering force to the revoknuckle upon the steering of the wheel,
wherein the assist knuckle includes:
an upper end hole which is located at an upper end portion of the assist knuckle and into which an upper end protrusion of the revoknuckle is pivotally coupled; and
a lower end hole which is located at the lower end portion of the assist knuckle and into which a lower end protrusion of the revoknuckle is pivotally coupled, and
wherein the revoknuckle is configured to be rotated with respect to the upper end hole and the lower end hole.

2. The suspension joining structure of claim 1, wherein the steering input portion includes a tie rod which is pivotally fastened to one end portion of the revoknuckle and to which a rotational force is applied by a steering actuator in a response to a steering input.

3. The suspension joining structure of claim 1, wherein the steering input portion includes a steering actuator which is fastened directly to the revoknuckle to apply a rotational force to the revoknuckle.

4. The suspension joining structure of claim 3, wherein the steering actuator is fixed to one end portion of the revoknuckle fastened to an end portion of the assist knuckle in which is offset from an axis of the strut portion and wherein a rotational force is applied to the revoknuckle by the steering actuator in a response to a steering input.

5. The suspension joining structure of claim 1, wherein the fastening unit includes a universal joint.

6. The suspension joining structure of claim 1, wherein the fastening unit includes:
a yoke which is located on and fixed to the second end portion of the lower arm;
a ball stud which is fastened to the lower end portion of the assist knuckle; and
a cross shaft portion which pivotally couples the yoke and the ball stud, wherein the yoke and the ball stud have rotation axes different from each other.

7. The suspension joining structure of claim 1,
wherein the revoknuckle includes a wheel mount portion to which the wheel is mounted, and
wherein the wheel mount portion is positioned between the upper end protrusion and the lower end protrusion of the revoknuckle.

* * * * *